(12) United States Patent
Hiyoshi et al.

(10) Patent No.: US 7,513,228 B2
(45) Date of Patent: Apr. 7, 2009

(54) INTERNAL COMBUSTION ENGINE

(75) Inventors: Ryosuke Hiyoshi, Kanagawa (JP); Tsuyoshi Arinaga, Kanagawa (JP); Shin Ishizaki, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 57 days.

(21) Appl. No.: 11/375,201

(22) Filed: Mar. 15, 2006

(65) Prior Publication Data

US 2006/0207535 A1 Sep. 21, 2006

(30) Foreign Application Priority Data

Mar. 15, 2005 (JP) .............................. 2005-072141

(51) Int. Cl.
*F01L 1/34* (2006.01)

(52) U.S. Cl. .............. 123/90.16; 123/90.15; 123/90.17; 123/90.31; 123/393; 701/105; 701/107

(58) Field of Classification Search ............... 123/90.16
See application file for complete search history.

(56) References Cited

U.S. PATENT DOCUMENTS

| | | | | |
|---|---|---|---|---|
| 6,405,697 | B2 * | 6/2002 | Mikame | ................... 123/90.18 |
| 6,435,149 | B2 | 8/2002 | Moriya et al. | |
| 6,513,467 | B2 * | 2/2003 | Nohara et al. | ............. 123/90.15 |
| 6,513,469 | B2 | 2/2003 | Nakamura et al. | |
| 6,999,864 | B2 * | 2/2006 | Iizuka et al. | ................. 701/103 |
| 7,011,054 | B2 * | 3/2006 | Hirowatari et al. | ....... 123/90.15 |
| 7,159,548 | B2 * | 1/2007 | Shindou | .................. 123/90.16 |
| 7,243,625 | B2 * | 7/2007 | Shindou | .................. 123/90.16 |
| 2004/0015287 | A1 * | 1/2004 | Ilzuka et al. | ................. 701/102 |
| 2005/0154522 | A1 * | 7/2005 | Fuwa et al. | .................. 701/107 |
| 2006/0037569 | A1 | 2/2006 | Minami et al. | |

FOREIGN PATENT DOCUMENTS

EP  1 162 350 B1  12/2001
JP  2001-065321 A  3/2001

* cited by examiner

*Primary Examiner*—Thomas E Denion
*Assistant Examiner*—Kyle M Riddle
(74) *Attorney, Agent, or Firm*—Foley & Lardner LLP (57) ABSTRACT

In an internal combustion engine, a variable lift and/or operating angle mechanism variably controls a lift and/or operating angle of an exhaust valve in accordance with a driving condition of the engine, a variable phase mechanism variably controls a phase of a lift center angle of the exhaust valve in accordance with the driving condition of the engine, a present position detecting section detects a present operating position of each of the variable lift and/or operating angle mechanism and variable phase mechanism, and a controlling section controls one of the variable lift and/or operating angle mechanism and the variable phase mechanism which operates normally in a direction in which an in-cylinder residual gas quantity becomes minimum when the other of the variable lift and/or operating angle mechanism and the variable phase mechanism has failed.

11 Claims, 6 Drawing Sheets

INTERNAL COMBUSTION ENGINE

BACKGROUND OF THE INVENTION

The present invention relates to an internal combustion engine and, more particularly, relates to the internal combustion engine in which a variable lift and/or operating angle mechanism which variably controls a lift and/or operating angle of an exhaust valve and a variable phase mechanism which variably controls a phase of a lift center angle of the exhaust valve are equipped.

A Japanese Patent Application First Publication No. 2001-65321 published on Mar. 13, 2001 exemplifies a, previously proposed variably operated valve apparatus for the internal combustion engine. In the previously proposed variably operated valve apparatus, a first variable mechanism which variably controls at least a lift characteristic of an engine valve in accordance with an engine driving condition, a second variable mechanism which variably controls at least an open-and-closure timing characteristic of the engine valve, and position detecting means for detecting a present position of either the first variable mechanism or the second variable mechanism are provided and an operation of one of the first and second variable mechanisms which does not fail is controlled to fall in a predetermined range in accordance with the position of the other of first and second variable mechanisms in accordance with the position of the other of the first and second variable mechanisms which has failed detected by the position detecting means, when one of the first and second variable mechanisms has failed. In the above-described Japanese Patent Application First Publication, when one of the first and second variable mechanisms has failed, the lift characteristic or the phase is controlled so as to avoid interferences between a piston and an associated engine valve and between an intake valve(s) of the engine valve and the exhaust valve(s) thereof. Thus, while avoiding a mechanical trouble, a reduction in mechanical performance is prevented.

SUMMARY OF THE INVENTION

However, in the previously proposed variably operated valve apparatus disclosed in the above-described Japanese Patent Application First Publication, in a case where one of the first variable mechanism and the second variable mechanism has failed in a state in which an exhaust valve closure timing is excessively advanced before a top dead center, such a control that an exhaust valve closure timing is positively retarded toward a top dead center is not carried out. Consequently, according to circumstances, there is a possibility that an in-cylinder residual gas quantity is increased and, thus, a combustion stability is worsened.

It is, therefore, an object of the present invention to provide an internal combustion engine which can avoid an increase in an in-cylinder residual gas quantity and a worsening of a combustion stability.

According to one aspect of the present invention, there is provided with an internal combustion engine, comprising: a variable lift and/or operating angle mechanism that variably controls a lift and/or operating angle of an exhaust valve in accordance with a driving condition of the engine; a variable phase mechanism that variably controls a phase of a lift center angle of the exhaust valve in accordance with the driving condition of the engine; a present position detecting section that detects a present operating position of each of the variable lift and/or operating angle mechanism and variable phase mechanism; and a controlling section that controls one of the variable lift and/or operating angle mechanism and the variable phase mechanism which operates normally in a direction in which an in-cylinder residual gas quantity becomes minimum when the other of the variable lift and/or operating angle mechanism and the variable phase mechanism has failed.

According to another aspect of the present invention, there is provided with an internal combustion engine, comprising: a variable lift and/or operating angle mechanism that variably controls a lift and/or operating angle of an exhaust valve in accordance with a driving condition of the engine; a variable phase mechanism that variably controls a phase of a lift center angle of the exhaust valve in accordance with the driving condition of the engine; a present position detecting section that detects a present operating position of each of the variable lift and/or operating angle mechanism and variable phase mechanism; and a controlling section that controls one of the variable lift and/or operating angle mechanism and the variable phase mechanism which operates normally in such a manner that an advance angle quantity of an exhaust valve closure timing from a top dead center becomes equal to or below a predetermined quantity when the other of the variable lift and/or operating angle mechanism and the variable phase mechanism has failed.

This summary of the invention does not necessarily describe all necessary features so that the present invention may also be a sub-combination of these described features.

DETAILED DESCRIPTION OF THE INVENTION

Reference will hereinafter be made to the drawings in order to facilitate a better understanding of the present invention.

Figure 1:
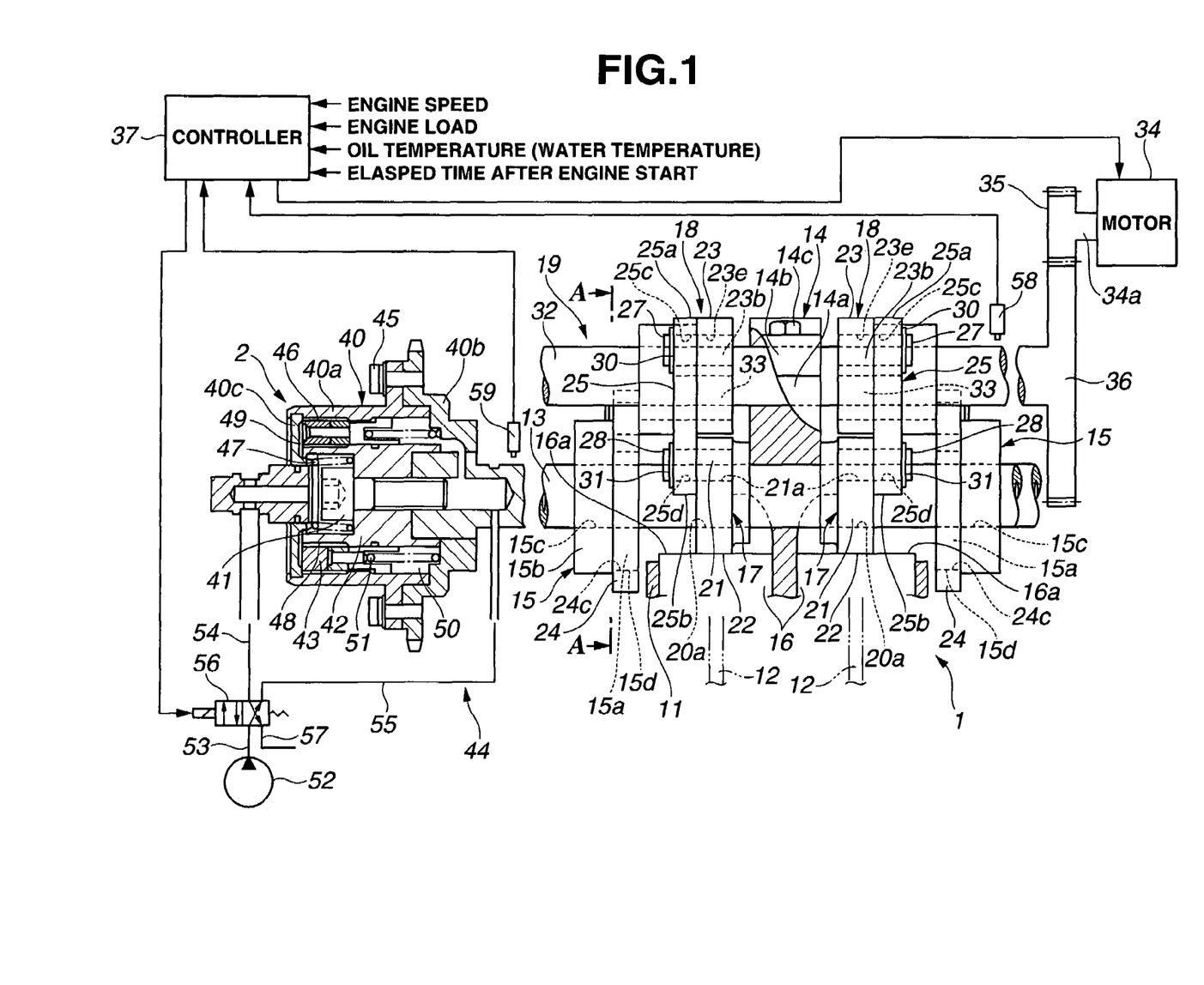
FIG. 1 is an explanatory view representing a variably operated valve apparatus arranged at an exhaust valve side of an internal combustion engine.

FIG. 1 shows a variably operated valve apparatus arranged on an exhaust valve side. This variably operated valve apparatus includes: a variable lift and/or operating angle mechanism 1 which is capable of expanding and constricting a lift and/or operating angle of an exhaust valve 12; and a variable phase mechanism which is capable of advancing or retarding a phase of a lift center angle of exhaust valve 12.

Variable lift and/or operating angle mechanism 1 simultaneously and continuously varies lift quantities (lift variables) and lift operating angles of two exhaust valves 12, 12 per engine cylinder slidably installed on a cylinder head 11 via valve guides in accordance with an engine driving condition. Variable phase mechanism 2 simultaneously and continuously varies a phase of a lift center angle of each of exhaust valves 12, 12 in accordance with the engine driving condition to modify an open-and-closure timing of each of exhaust valves 12, 12.

Figure 2:
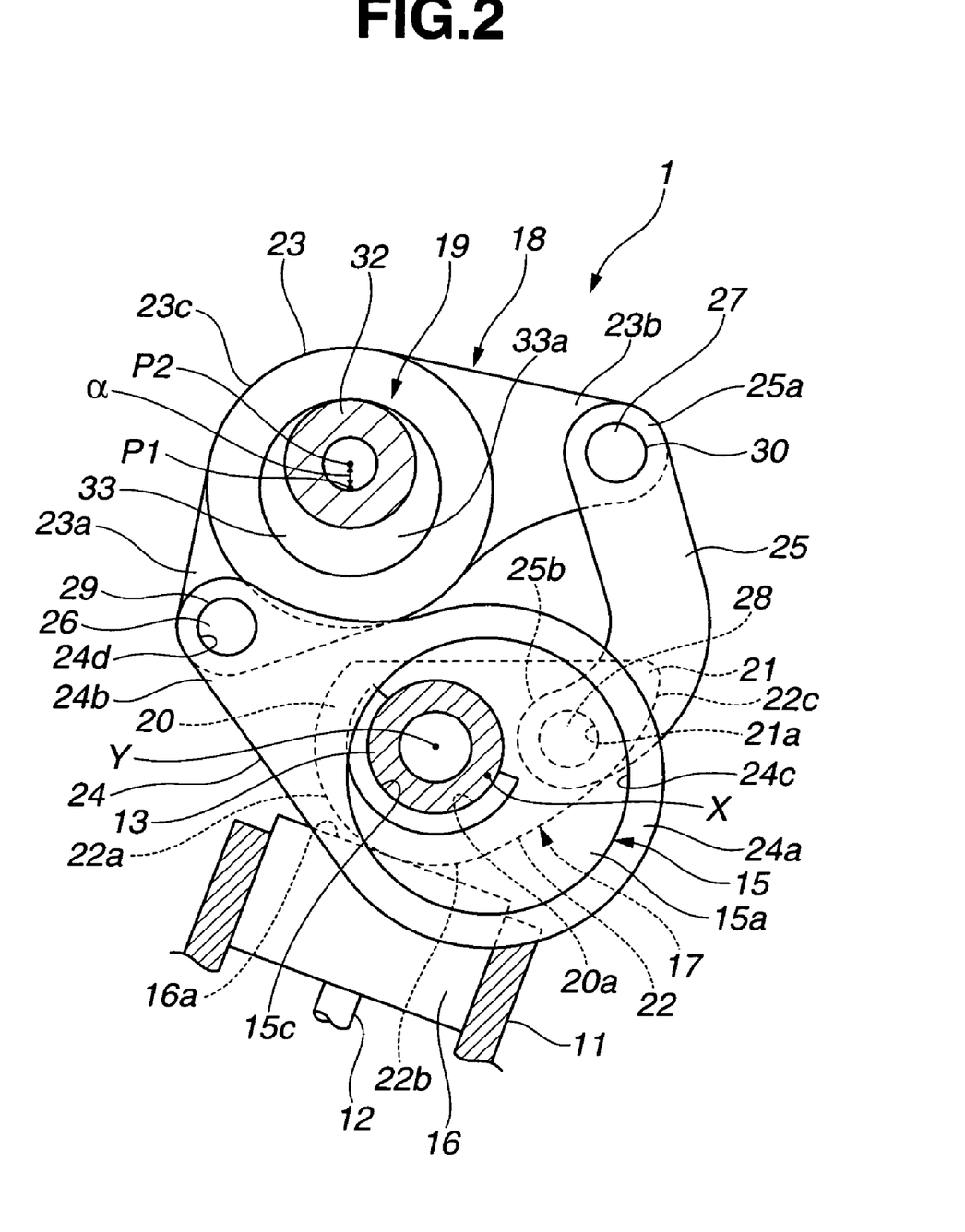
FIG. 2 is a cross sectional view cut away along a line of A-A shown in FIG. 1.
Figure 3:
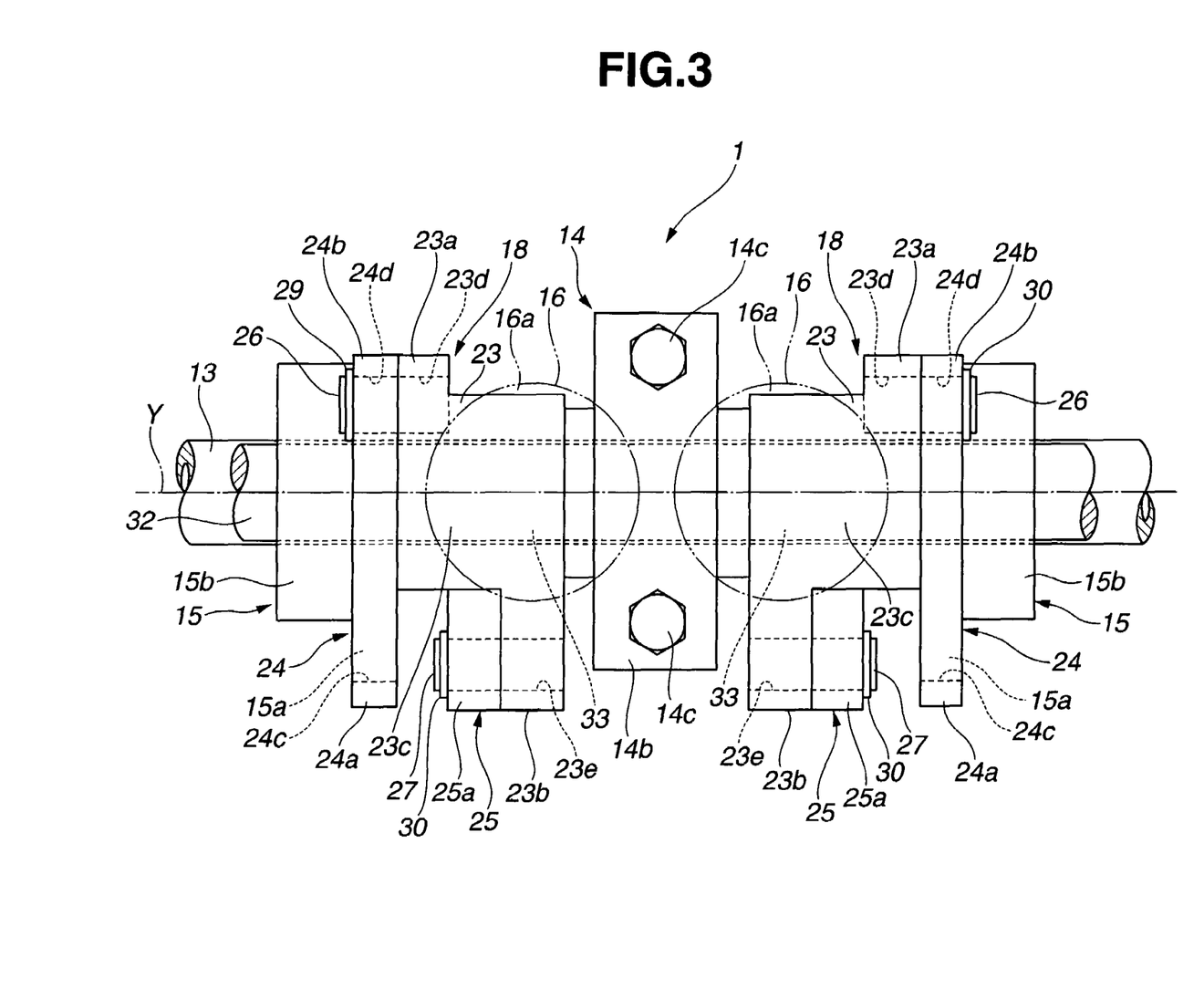
FIG. 3 is a plan view of a variable lift and/or operating angle mechanism.

Variable lift and/or operating angle mechanism 1, as shown in FIGS. 1 through 3, includes: a hollow drive axle 13 rotatably supported on a journal 14 located at an upper portion of a cylinder head 11; two drive cams 15, 15 which are eccentric rotary cams fixed onto hollow drive axle 13 by means of a press fit; swing cams 17, 17 which open and operate respective exhaust valves 12, 12 by slidably contacting on flat upper surfaces 16a, 16a of valve lifters 16, 16 disposed on upper end portions of respective exhaust valves 12, 12; transmission mechanisms 18, 18, interlinked between drive cams 15, 15 and swing cams 17, 17, to transmit a torque (revolving force) of each drive cam 15 as a swing force of each of swing cams 17, 17; and a control mechanism 19 which variably controls an operation position of each of transmission mechanisms 18, 18.

Drive axle 13 is disposed along a forward-and-backward direction of the engine to which a torque (revolving force) from a crankshaft of the engine is transmitted via a timing chain which is provided on one end portion thereof so on and which is wound on a timing sprocket 40 of variable phase mechanism 2 which will be described later.

Journal 14 is provided on an upper end portion of cylinder head 11, as shown in FIG. 1, and includes a main bracket 14a which supports an upper portion of drive axle 13; and a sub bracket 14b installed on an upper end portion of main bracket 14a and which rotatably supports a control axle 32 which will be described later. Both of main and sub brackets 14a, 14b are tightened (screwed) together by means of a pair of bolts 14c, 14c from an upper direction above cylinder head 11.

Both drive cams 15 is of a substantially ring shape, as shown in FIGS. 1 through 3, and includes: a cam main body (main frame) 15a; and a cylindrical portion 15b integrally disposed on an external (outer) end surface of cam main body 15a. A drive axle inserting hole 15c is penetrated in an internal axle direction of each drive cam 15. An axial center X of cam main body 15a is offset by a predetermined quantity in a radial direction from an axial center Y of drive axle 13. In addition, respective drive cams 15, 15 are fixed and inserted onto drive axle 13 in the press fit form so as not to be interfered against respective valve lifters 16, 16 and outer peripheral surfaces 15d, 15d of both of cam main bodies 15a, 15a are formed in the same cam profiles.

Swing cams 17, 17 exhibit substantially lateral letter-U shape forms, as typically shown in FIG. 2, and includes: a ring shaped basic end portion 20 located on one end side portion of each swing cam 17, 17 through which a supporting hole 20a is penetrated and formed into which drive axle 13 is penetrated; and a cam nose portion 21 located on the other end portion through which a pin hole 21a is penetrated. In addition, a cam surface 22 is formed on a lower surface of each of swing cams 17, 17. A basic circular surface 22a, a ramp surface 22b extended in a substantially arc shape from basic circular surface 22a toward each cam nose portion 21, and a lift surface 22c located at a tip side of ramp surface 22b are continuously formed on each cam surface 22. Basic circular surface 22a, ramp surface 22b, and lift surface 22c are contacted on a predetermined position of an upper surface 16a of each valve lifter 16 in accordance with a swung position of each swing cam 17.

Each transmission mechanism 18, 18 includes, as shown in FIG. 2, a rocker arm 23 disposed on an upper portion of drive axle 13, a link arm 24 which interlinks between an end portion 23a of rocker arm 23 and drive cam 15, and a link rod 25 which is a interlink member which interlinks between the other end portion 23b of rocker arm 23 and a corresponding one of swing cams 17, 17.

Each rocker arm 23 is bent in a substantially crank shape as viewed from a plan view of FIG. 3 (as shown in FIG. 3) and includes a cylindrical base portion 23c located at a center of a corresponding one of rocker arms 23, 23 and which is rotatably supported on a control cam 23 which will be described later. In addition, a pin hole 23d through which a pin 26 relatively rotatably linked with link arm 24 is inserted is penetrated through one end portion 23a projected toward each outer end portion of each base portion 23c of respective rocker arms 23, 23, as typically shown in FIGS. 2 and 3. On the other hand, a pin hole 23e through which a pin 27 relatively rotatably linked with one end portion 25a of each link rod 25 is penetrated is formed at the other end portion 23b projected through each inner end portion of each base portion 23c.

In addition, each link arm 24, 24 includes: a ring-shaped (annular) base portion 24a having a relatively large diameter; and a projection end 24b projected at a predetermined position on an outer peripheral surface of annular base portion 24a. A fit hole 24c which is fitted rotatably into an outer peripheral surface of cam main body 15a of drive cam 15 is formed at a center position of base portion 24a. A pin hole 24d through which a pin 26 is rotatably inserted is penetrated at projection end 24b of each link arm 24, 24.

Furthermore, each link rod 25 is bent in a substantially sign of < shape and has a predetermined length as typically shown in FIG. 2 and pin inserting holes 25c, 25d are formed on respective end portions 25a, 25b of each link rod 25 as shown in FIG. 1. Ends of respective pins 27, 28 are rotatably inserted into respective pin inserting holes 25c, 25d. Respective pins 27, 28 are rotatably inserted into a pin hole 23e provided on the other end portion 23b of each rocker arm 23 and a pin hole 21a provided on a cam nose portion 21 of each of swing cams 17, 17.

Each link rod 25 limits a maximum swing range of the corresponding one of respective swing cams 17, 17 within a swing range of the corresponding one of rocker arms 23, 23.

It is noted that snap rings 29, 30, and 31 are provided on one end portions of respective pins 26, 27, and 28 to limit axial movements of each link arm 24 and each link rod 25.

Control mechanism 19 includes: control axle 32 disposed in the forward-and-backward direction of the engine; control cams 33, each fixed on an outer periphery of control axle 32 to serve as a swing fulcrum of each rocker arm 23; and an electric motor 34 which is an electrically operated (powered) actuator to control a rotary position of control axle 32.

Control axle 32 is disposed in parallel to driver axle 13 and is rotatably supported between a journal groove of main bracket 14a of journal 14 and sub bracket 14b of journal 14 as described above. On the other hand, each control cam 33 is cylindrically shaped and a position of an axial center P1 of each control cam 33 is offset from a position of an axial center P2 of each control cam 33 by α, as typically shown in FIG. 2.

Electric motor 34 transmits the revolving force (torque) to control axle 32 via a meshing between a first spur gear 35 provided on a tip end 34a of a drive shaft and a second spur gear 36 installed on a backward end portion of control axle 32.

Electric motor 34 is driven in response to a control signal from a controller 37 which detects an engine driving condition. The engine driving condition is determined by controller 37 from, for example, an engine speed, an engine load, an oil temperature (water temperature of coolant), and an elapsed time after an engine start.

On the other hand, variable phase mechanism 2 is disposed on a tip side of drive axle 13 as shown in FIG. 1 and includes timing sprocket 40 disposed at the tip portion of drive axle 13 as shown in FIG. 1 and to which the revolving force from the crankshaft of the engine is transmitted via the timing chain (not shown); a sleeve 42 fixed from the axial direction at the axial direction of drive axle 13 by means of a bolt 41; a cylindrical gear 43 interposed between timing sprocket 40 and sleeve 42; and a hydraulic circuit 44 which is a drive mechanism to drive cylindrical gear 43 to move in the forward-and-backward direction of drive axle 13.

Timing sprocket 40 includes a sprocket portion 40b in which a chain (not shown) is wound on a backward end portion of a cylindrical main frame (main body) 40a of timing sprocket 40b and which is fixed by means of bolts 45; and a front end opening of a cylindrical main frame 40a which is closed with a front cover 40c. In addition, inner teeth 46 in a helical spur gear form are formed on an inner peripheral surface of cylindrical main body 40a.

A fitting groove into which the tip portion of drive axle 13 is fitted is formed on the backward end portion of sleeve 42 and a coil spring 47 is attached which biases timing sprocket 40 in the forward direction via front cover 40c is mounted within a hold groove provided at the front end portion of sleeve 42. Outer teeth 48 in the spur gear form are formed on an outer peripheral surface of sleeve 42.

Cylindrical gear 43 is split into two gear constituting portions from an axial right angle direction and is biased in a direction toward which forward-and-backward gear constituting portions are mutually approached to each other by means of a pin and a spring and spur gear type inner and outer teeth which mesh respective inner teeth 46 with outer teeth 48 are formed on the inner and outer peripheral surfaces of cylindrical gear 43. A hydraulic pressure relatively supplied to first and second hydraulic pressure chambers 49, 50 formed on the forward-and-backward direction of cylindrical gear 43 causes a slidable contact thereof between each of inner and outer teeth and cylindrical gear 43 is moved in the forward-and-backward directions (leftward-and-rightward directions in FIG. 1). In addition, this cylindrical gear 43 controls exhaust valves 12, 12 at a maximum retardation angle position when cylindrical gear 43 is moved at a maximum forward movement position at which cylindrical gear 43 is stricken (impinged) on front cover 40c. On the other hand, this cylindrical gear 43 controls exhaust valves 12, 12 at a maximum advance angle position when cylindrical gear 43 is moved at a maximum backward movement position. Furthermore, a return spring 51 elastically installed within a second hydraulic chamber 50 is biased at the maximum forward movement position in a case where the hydraulic pressure within a first hydraulic pressure chamber 49 is not supplied by means of return spring 51.

Hydraulic circuit 44 includes: a main gallery 53 connected at a downstream side of an oil pump 52 communicated with an oil pan (not shown); first and second hydraulic pressure passages 54, 55 branched at a downstream side of main gallery 53 and connected to first and second hydraulic pressure chambers 49, 50; a solenoid type flow passage switching valve 56 installed at a branch position between main gallery 53 and first and second hydraulic pressure passages 54, 55; and a drain passage 57 connected to flow passage switching valve 56.

Flow passage switching valve 56 is switched and driven in response to the control signal from same controller 37 which drivingly controls electric motor 34 of variable lift and/or operating angle mechanism 1.

Controller 37 detects a present engine driving condition on the basis of detection signals of the engine (revolution) speed from a crank angle sensor, an intake air flow quantity (the engine load) from an airflow meter, and an engine oil temperature from an engine oil temperature sensor through arithmetic operations and outputs the control signals to electric motor 34 and to flow passage switching valve 56 on the basis of detection signals from a first position detection sensor 58 which detects a present revolution position of control axle 32 as a present position detecting means (section) and from a second position detection sensor 58 which detects a relative pivotal position between drive axle 13 and timing sprocket 40 as the present position detecting means (section).

That is to say, controller 37 determines a target lift characteristic of each exhaust valve 12 (in the case of one exhaust valve per engine cylinder, exhaust valve 12), in other words, determines a target revolution position of control axle 32, from information signals on the engine speed, the engine load, the oil temperature, and an elapsed time after a start of the engine and rotatably controls control cam 33 via control axle 32 to a predetermined revolution angle position by revolving electric motor 34 on the basis of the determined target revolution position (this corresponds to a command signal) of control axle 32. In addition, first position detection sensor 58 monitors an actual revolution position of control axle 32 and revolves control axle 32 to a target phase by means of a feedback control.

On the other hand, at flow passage switching valve 56, a target advance angle quantity of each exhaust valve 12, 12 (in the case of one exhaust valve 12 per engine cylinder, exhaust valve 12) is determined from the information signal from respective sensors as has been described before and first hydraulic pressure passage 54 and main gallery 53 are communicated for a predetermined time by means of flow passage switching valve 56 on the basis of the determined target advance angle quantity and second hydraulic pressure passage 55 and drain passage 57 are communicated for another predetermined time. Thus, the relative pivotal position between timing sprocket 40 and drive axle 13 is converted via cylindrical gear 43 so as to be controlled toward the advance angle side. In addition, in this case, second position detection sensor 59 previously monitors the actual relative pivotal position between timing sprocket 40 and drive axle 13 and a feedback control causes drive axle 13 to be revolved toward the target relative pivotal position, namely, the target advance angle quantity.

In this embodiment, when either one of variable lift and/or operating angle mechanism 1 and variable phase mechanism 2 has failed, one of the two variable mechanisms 1 and 2 which does not fail (operates normally) is controlled in a direction toward which an in-cylinder residual gas quantity (per engine cylinder) provides minimum. In other words, when either one of variable lift and/or operating angle mechanism 1 and variable phase mechanism 2 has failed, namely, the other of variable lift and/or operating angle mechanism 1 and variable phase mechanism 2 which does not fail (which operates normally) is controlled in such a manner that the advance angle quantity of an exhaust valve closure timing becomes equal to or below a predetermined quantity.

If the exhaust valve closure timing is excessively advanced before the top dead center, a combustion chamber volume after the closure of each exhaust valve 12, 12 is excessively enlarged so that already combusted gas (burned gas) is resided in an inside of each cylinder and, thus, a combustion stability becomes worsened. Therefore, when either one of variable lift and/or operating angle mechanism 1 and variable phase mechanism 2 has failed, the other of variable lift and/or operating angle mechanism 1 and variable phase mechanism 2 which does not fail is controlled in a direction toward which the in-cylinder residual gas quantity becomes minimum. Thus, the in-cylinder residual gas quantity is reduced and the worsening of the combustion stability is avoided.

Figure 4:
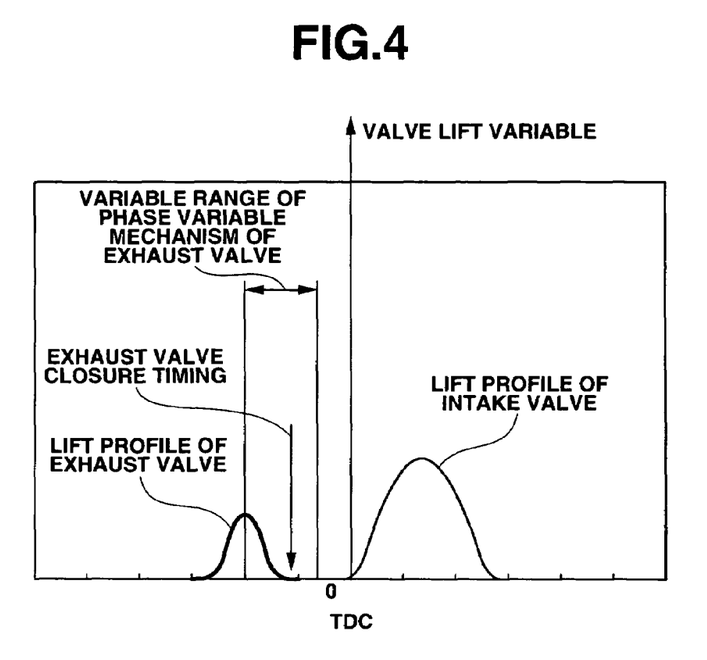
FIG. 4 is an explanatory view for explaining a valve timing in a case where the variable lift and/or operating angle mechanism is in a small lift state during a fixation of a most advanced angle of a variable phase mechanism.

FIG. 4 shows a valve timing chart in which variable lift and/or operating angle mechanism 1 is in a small lift state during a most advance angle fixation state of variable phase mechanism 2, namely, the valve timing chart in a case where variable phase mechanism 2 has failed in a state where a phase of a lift center angle of each exhaust valve 12, 12 (in the case of one exhaust valve per engine cylinder, exhaust valve 12) is in a most advanced angle position and, when the lift center angle of each exhaust valve 12 is fixed (locked) at the most advance angle position, exhaust valve 12 is in a small lift and small operating angle state. In this case, since the exhaust valve closure timing is excessively advanced from the top dead center, the in-cylinder residual gas quantity is augmented. The combustion stability becomes worsened.

Figure 5:
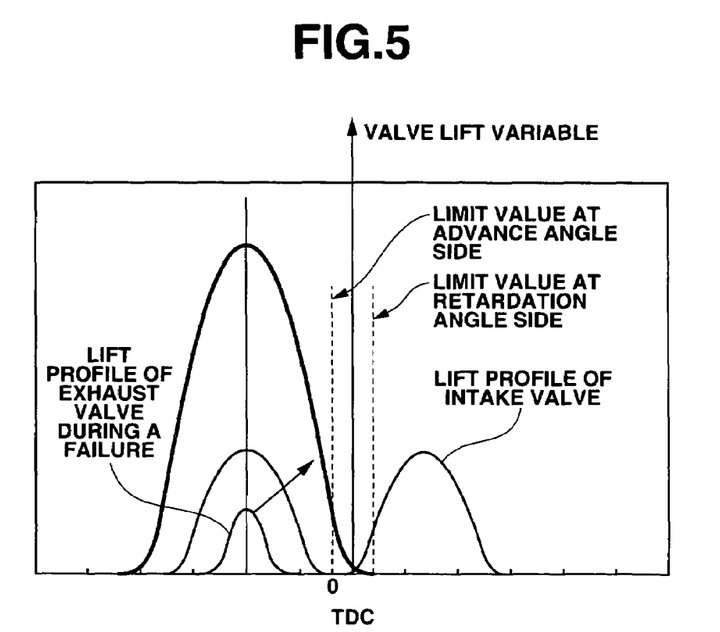
FIG. 5 is an explanatory view representing a valve timing when a control of the variable lift and/or operating angle mechanism according to the present invention is performed.

Then, as shown in FIG. 5, since the valve lift quantity (variable) of each exhaust valve 12 is fixed to a value such that the advance angle quantity from the top dead center at the exhaust valve closure timing becomes equal to or below a predetermined quantity, the in-cylinder residual gas quantity is reduced and the worsening of the combustion stability can be avoided.

In more details, during the failure of variable phase mechanism 2, variable lift and/or operating angle mechanism 1 is controlled in such a manner that the exhaust valve closure timing is within a predetermined range previously determined according to the experiments, namely, the exhaust valve closure timing is within a previously set predetermined range crossing the top dead center (TDC). Specifically, the valve lift quantity (variable) of (each) exhaust valve 12 is fixed to the valve lift quantity (variable) so as to suppress the exhaust valve closure timing between an advance angle side limit value and a retardation angle side limit value. In this embodiment, the exhaust valve closure timing is fixed to the valve lift quantity (variable) which provides the retardation angle side limit value (refer to a bold solid line in FIG. 5).

Figure 6:
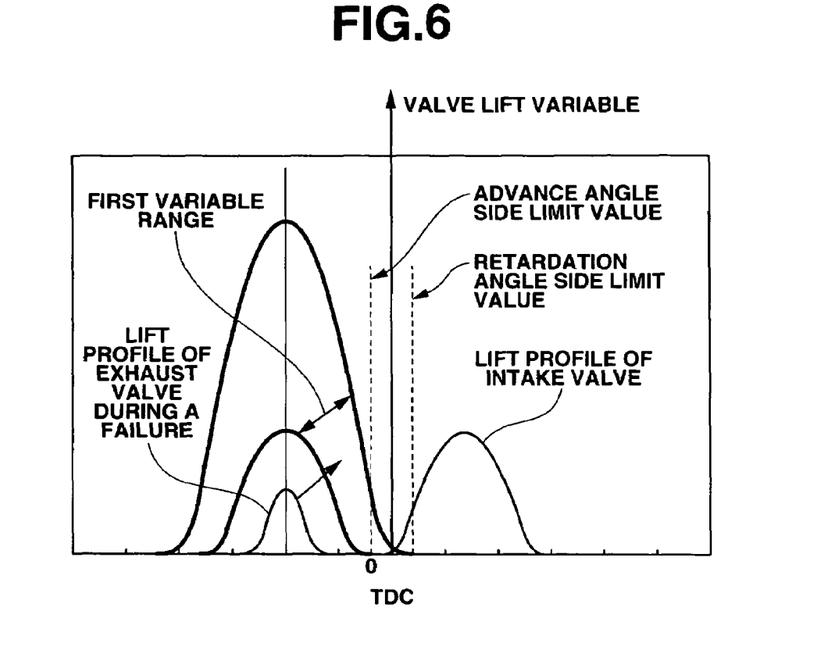
FIG. 6 is an explanatory view for explaining a valve timing when a control of the variable lift and/or operating angle mechanism according to the present invention is performed.

In addition, as shown in FIG. 6, the valve lift quantity (variable) of (each) the exhaust valve may variably be controlled by means of variable lift and/or operating angle mechanism 1 in a range that the exhaust valve closure timing falls in a value between the advance angle side limit value and the retardation angle side limit value. Hence, the in-cylinder residual gas quantity can be reduced and the valve lift quantity (variable) of (each) exhaust valve 12 can be avoided from being worsened. In other words, the valve lift quantity (variable) of (each) exhaust valve 12 may variably be controlled within a first variable range (a region enclosed with two bold solid lines shown in FIG. 6) in which the advance angle quantity of the exhaust valve closure timing from the top dead center becomes equal to or below the predetermined quantity.

It is noted that, to perform the controls as shown in FIGS. 5 and 6, variable lift and/or operating angle mechanism 1 is controlled so that exhaust valve(s) 12 is not interfered against the piston nor suction (intake) valve(s). In other words, the advance angle side limit value and the retardation angle side limit value are finally determined, with the lift center angle of (each) exhaust valve 12 fixed position taken into consideration.

Figure 7:
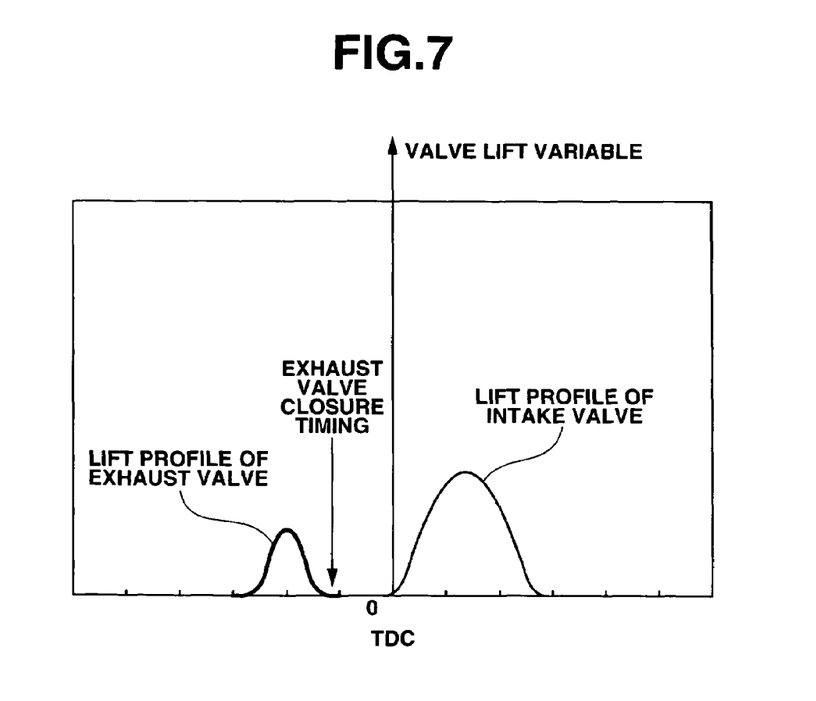
FIG. 7 is an explanatory view for explaining a valve timing when a phase variable mechanism is in an advanced angle state during a fixation of the variable lift and/or operating angle mechanism onto a small lift and small operating angle.

FIG. 7 shows a valve timing chart in a case where variable phase mechanism 2 is in an advance angle state during the variable lift and/or operating angle mechanism 1 fixed to small lift and small operating angle, namely, in a case where the phase of the lift center angle of (each) exhaust valve 12 is in the advance angle side when the valve lift quantity (variable) of (each) exhaust valve 12 is in the small lift state and variable lift and/or operating angle mechanism 1 is fixed (locked). In this case, the exhaust valve closure timing is excessively advanced from the top dead center and the in-cylinder residual gas quantity is augmented and the combustion stability is worsened.

Figure 8:
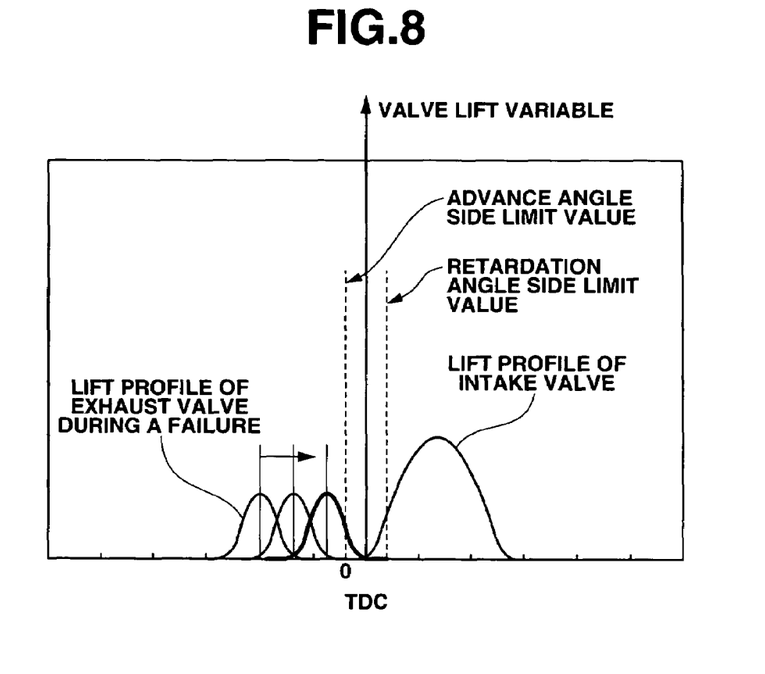
FIG. 8 is an explanatory view for explaining a valve timing when a control of the variable phase mechanism according to the present invention is performed.

In order to cope with the above-described deficiency, as shown in FIG. 8, the phase of the lift center angle of (each) exhaust valve 12 is retarded and fixed to a value such that the advance angle quantity of the valve closure timing of (each) exhaust valve 12 from the top dead center becomes equal to or below the predetermined quantity so that the in-cylinder residual quantity is reduced and the worsening of the combustion stability is avoided.

In more details, variable phase mechanism 2 is controlled so that the exhaust valve closure timing falls within the predetermined range previously determined according to the experiments, namely, the exhaust valve closure timing falls within the predetermined range crossing the top dead center (TDC). Exhaust valve(s) 12 is fixed to the lift center angle such that the exhaust valve closure timing falls within this predetermined range between the advance angle side limit value and the retardation angle side limit value. In this embodiment, the valve closure timing of exhaust valve 12 is fixed to the lift center angle at which the exhaust valve closure timing provides the retardation angle limit value (refer to a bold solid line of FIG. 8).

Figure 9:
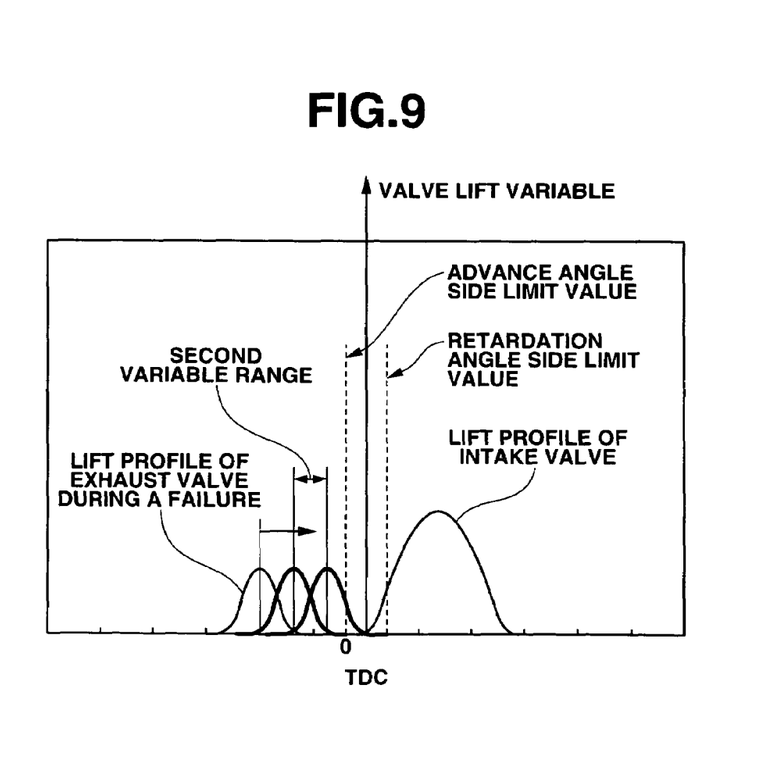
FIG. 9 is an explanatory view representing a valve timing when a control of the variable phase mechanism according to the present invention is performed.

In addition, as shown in FIG. 9, the phase of the lift center angle of exhaust valve 12 is variably controlled in a range in which the exhaust valve closure timing falls in a value between the advance angle side limit value and the retardation angle side limit value. Thus, the in-cylinder residual gas quantity can be reduced and the worsening of the combustion stability can be avoided. In other words, the phase of the lift center angle of exhaust valve 12 may variably be varied within a second variable range in which the advance angle quantity of the exhaust valve closure timing from the top dead center becomes equal to or below the predetermined quantity (a range between each lift center angle of a lift profile denoted by two bold solid lines shown in FIG. 9).

it is noted that, in order to perform the controls as shown in FIGS. 8 and 9, variable phase mechanism 2 is controlled so that exhaust valve 12 does not interfere against the piston nor the intake valve(s). In this case, retardation angle side limit value and advance angle side limit value are finally determined with the valve lift quantity (variable) of (each) exhaust valve 12 during the fixation of variable lift and/or operating angle mechanism 1 taken into consideration.

It is also noted that controller 37 (controlling section) includes: a first failure determining section that determines whether the present position of variable lift and/or operating angle mechanism 1 is made coincident with the target position thereof to determine whether a failure of variable lift and/or operating angle mechanism 1 occurs on the basis of the present position information of first position detection sensor 58; and a second failure determining section that determines whether the present position of variable phase mechanism 2 is made coincident with the target position of variable phase mechanism 2 to determine whether the failure of variable phase mechanism 2 occurs on the basis of the present position information of second position diction sensor 59. It is also noted that one scale in a lateral axis of each of FIGS. 4 through 9 corresponds to 60° crank angle.

A technical concept of the present invention that can be grasped from the above-described embodiment together with advantages of the present invention. (1) The internal combustion engine includes: the variable lift and/or operating angle mechanism which variably controls the lift and/or operating angle of each exhaust valve in accordance with the engine operating condition (in the case of one exhaust valve per cylinder, the exhaust valve); the variable phase mechanism which variably controls the phase of the lift center angle of each exhaust valve (in the case of one exhaust valve per cylinder, the exhaust valve); and a position detecting section that detects the present operating positions of the variable lift and/or operating angle mechanism and variable phase mechanism and one of the two variable mechanism which does not fail (which operates normally) is controlled in the direction in which the in-cylinder residual gas quantity becomes minimum when either one of the variable lift and/or operating angle adjusting mechanisms and variable phase mechanism has failed. Thus, when either one of the variable lift and/or operating angle mechanism and variable phase mechanism has failed, it can be avoided that the in-cylinder residual gas is augmented and the combustion stability becomes worsened.

(2) The internal combustion engine includes: the variable lift and/or operating angle mechanism which variably controls the lift and/or operating angle of each exhaust valve in accordance with the engine operating condition (in the case of one exhaust valve per cylinder, the exhaust valve); the variable phase mechanism which variably controls the phase of the lift center angle of each exhaust valve (in the case of one exhaust valve per cylinder, the exhaust valve); and a position detecting section that detects the present operating positions of the variable lift and/or operating angle mechanism and variable phase mechanism and one of the two variable mechanism which does not fail is controlled in such a manner that the advance angle quantity of the exhaust valve closure timing from the top dead center is equal to or below the predetermined quantity when either one of the variable lift and/or operating angle adjusting mechanisms and variable phase mechanism has failed.

(3) In the internal combustion engine described in either item (1) or item (2), when the variable phase mechanism is fixed in a state in which the phase of the lift center angle of each exhaust valve is relatively advanced, the valve lift quantity of each exhaust valve is fixed to the predetermined value such that the advance angle quantity of the exhaust valve closure timing from the top dead center becomes equal to or below the predetermined quantity.

(4) In the internal combustion engine as described in item (1) or item (2), in a case where the variable phase mechanism is fixed in a state where the phase of the lift center angle of each exhaust valve is relatively advanced, the valve lift quantity of each exhaust valve is variably controlled in the first variable range such that the advance angle quantity of the exhaust valve closure timing from the top dead center becomes equal to or below the predetermined quantity.

(5) In the internal combustion engine as described in any one of items of (1) through (4), in a case where the variable lift and/or operating angle mechanism is fixed in a state in which the valve lift quantity of (each) exhaust valve is relatively in the small lift state, the phase of the lift center angle of each exhaust valve is retarded and fixed in such a manner that the advance angle quantity of the exhaust valve closure timing from the top dead center becomes equal to or below the predetermined quantity.

(6) In the internal combustion engine as described in any one of items (1) through (4), in a case where the variable lift and/or operating angle variable mechanism is fixed in a state in which the valve lift quantity of the exhaust valve is relatively in a small lift quantity, the phase of the lift center angle is variably controlled in a second variable range such that the advance angle quantity of the exhaust valve closure timing from the top dead center becomes equal to or below the predetermined quantity.

This application is based on a prior Japanese Patent Application No. 2005-072141 filed in Japan on Mar. 15, 2005, the disclosure of which is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An internal combustion engine, comprising:
a variable lift and/or operating angle mechanism that variably controls a lift and/or operating angle of an exhaust valve in accordance with a driving condition of the engine;
a variable phase mechanism that variably controls a phase of a lift center angle of the exhaust valve in accordance with the driving condition of the engine;
a present position detecting section that detects a present operating position of each of the variable lift and/or operating angle mechanism and variable phase mechanism; and
a controlling section that controls one of the variable lift and/or operating angle mechanism and the variable phase mechanism which operates normally such that an advance angle quantity of an exhaust valve closure timing from a top dead center becomes equal to or below a predetermined quantity when the other of the variable lift and/or operating angle mechanism and the variable phase mechanism has failed,
wherein, in a case where the variable phase mechanism is fixed in a state where the phase of the lift center angle of the exhaust valve is relatively advanced, the controlling section, through the variable lift and/or operating angle mechanism, variably controls a valve lift quantity of the exhaust valve within a first variable range in which the advance angle quantity of the exhaust valve closure timing from the top dead center becomes equal to or below the predetermined quantity.

2. The internal combustion engine as claimed in claim 1, wherein, in the case where the variable phase mechanism is fixed in the state in which the phase of the lift center angle of the exhaust valve is relatively advanced, the controlling section, through the variable lift and/or operating angle mechanism, fixes a valve lift variable of the exhaust valve to a predetermined value at which the advance angle quantity of the exhaust valve closure timing from the top dead center becomes equal to or below the predetermined quantity.

3. The internal combustion engine as claimed in claim 1, wherein, in the case where the variable phase mechanism is fixed in the state where the phase of the lift center angle of the exhaust valve is relatively advanced, the controlling section, through the variable lift and/or operating angle mechanism, variably controls the valve lift quantity of the exhaust valve within a first variable range in which the advance angle quantity of the exhaust valve closure timing from the top dead center becomes equal to or below the predetermined quantity in a direction in which an in-cylinder residual gas quantity becomes minimum.

4. The internal combustion engine as claimed in claim 1, wherein the controlling section comprises a failure determining section that determines whether the present operating position of the variable phase mechanism is made coincident with a target position of the variable phase mechanism to determine whether a failure of the variable phase mechanism has occurred and wherein the controlling section, through the variable lift and/or operating angle mechanism, variably controls the valve lift quantity of the exhaust valve within the first variable range in which the advance angle quantity of the exhaust valve closure timing from the top dead center becomes equal to or below the predetermined quantity when the failure determining section determines that the failure of the variable phase mechanism has occurred.

5. The internal combustion engine as claimed in claim 1, wherein the variable lift and/or operating angle mechanism comprises a drive axle having drive cams on its outer peripheries thereof link arms having one end portions rotatably interlinked with the outer peripheries of the drive cams; rocker arms having one end portions rotatably interlinked with the other end portions of the link arms and having swing centers variably controlled by control cams; swing cams which are operated to open and close associated engine valves; a linkage member which mechanically and rotatably interlinks between each swing cam and the other end portion of each rocker arm to limit a maximum swing range of each swing cam within a swing range of each rocker arm; and an actuator which rotatably controls each control cam via a control axle in accordance with the driving condition of the engine.

6. The internal combustion engine as claimed in claim 5, wherein the variable phase mechanism comprises a timing sprocket to which a rotating force is transmitted from an engine crankshaft; a sleeve axially fixed onto a tip portion of the drive axle; a cylindrical gear interposed between the timing sprocket and the sleeve; and a hydraulic circuit which drivingly controls the cylindrical gear in a forward-and-backward direction of the drive axle in accordance with the driving condition of the engine.

7. The internal combustion engine as claimed in claim 5, wherein the associated engine valves are exhaust valves.

8. An internal combustion engine, comprising:
a variable lift and/or operating angle mechanism that variably controls a lift and/or operating angle of an exhaust valve in accordance with a driving condition of the engine;
a variable phase mechanism that variably controls a phase of a lift center angle of the exhaust valve in accordance with the driving condition of the engine;
a present position detecting section that detects a present operating position of each of the variable lift and/or operating angle mechanism and variable phase mechanism; and
a controlling section that controls one of the variable lift and/or operating angle mechanism and the variable phase mechanism which operates normally such that an advance angle quantity of an exhaust valve closure timing from a top dead center becomes equal to or below a predetermined quantity when the other of the variable lift and/or operating angle mechanism and the variable phase mechanism has failed,
wherein, in a case where the variable lift and/or operating angle mechanism is fixed in a state where a valve lift variable of the exhaust valve is at a relatively small lift side, the controlling section, through the variable phase mechanism, variably controls the phase of the lift center angle of the exhaust valve within a second variable range in which the advance angle quantity of the exhaust valve closure timing from the top dead center becomes equal to or below the predetermined quantity.

9. The internal combustion engine as claimed in claim 8, wherein the controlling section comprises a first failure determining section that determines whether the present operating position of the variable lift and/or operating angle mechanism is made coincident with a target position thereof to determine whether a failure of the variable lift and/or operating angle mechanism has occurred and wherein the controlling section, through the variable phase mechanism, variably controls the phase of the lift center angle of the exhaust valve within the second variable range in which the advance angle quantity of the exhaust valve closure timing from the top dead center becomes equal to or below the predetermined quantity when the first failure determining section determines that the failure of the variable lift and/or operating angle mechanism has occurred.

10. The internal combustion engine as claimed in claim 8, wherein, in the case where the variable lift and/or operating angle mechanism is fixed in the state where the valve lift variable of the exhaust valve is at the relatively small lift side, the controlling section, through the variable phase mechanism, retards and fixes the phase of the lift center angle of the exhaust valve such that the advance angle quantity of the exhaust valve closure timing from the top dead center becomes equal to or below the predetermined quantity.

11. The internal combustion engine as claimed in claim 8, wherein, in the case where the variable lift and/or operating angle mechanism is fixed in the state where the valve lift variable of the exhaust valve is at the relatively small lift side, the controlling section, through the variable phase mechanism, variably controls the phase of the lift center angle of the exhaust valve within the second variable range in which the advance angle quantity of an exhaust valve closure timing from the top dead center becomes equal to or below the predetermined quantity in a direction in which an in-cylinder residual gas quantity becomes minimum.

* * * * *